United States Patent [19]

Guth

[11] 4,268,839
[45] May 19, 1981

[54] PHOTO-TIDE LEVEL RECORDER

[76] Inventor: Jack E. Guth, 630 Oak St., Herndon, Va. 22070

[21] Appl. No.: 117,651

[22] Filed: Feb. 1, 1980

[51] Int. Cl.³ .................. G01D 9/42; G01F 23/06
[52] U.S. Cl. .................... 346/107 R; 73/312
[58] Field of Search .............. 346/107 R; 73/312

[56] References Cited

U.S. PATENT DOCUMENTS

| 1,054,849 | 3/1913 | Lawrence | 73/312 |
| 2,657,577 | 11/1953 | Falk | 73/312 X |
| 2,716,341 | 8/1955 | Ilfrey et al. | 73/312 |
| 3,618,122 | 11/1971 | Maschak | 73/312X |

FOREIGN PATENT DOCUMENTS 100887  2/1941  Sweden ................. 73/312

Primary Examiner—George H. Miller, Jr.

[57] ABSTRACT

A tide level recorder records tide elevations utilizing a free floating graduated rod-staff, against a fixed index mark, simultaneous with a chronometer reading. The free floating graduated rod-staff eliminates mechanical errors evident in existing tide level recorders with counter weights and springs.

1 Claim, 1 Drawing Figure

U.S. Patent    May 19, 1981    4,268,839
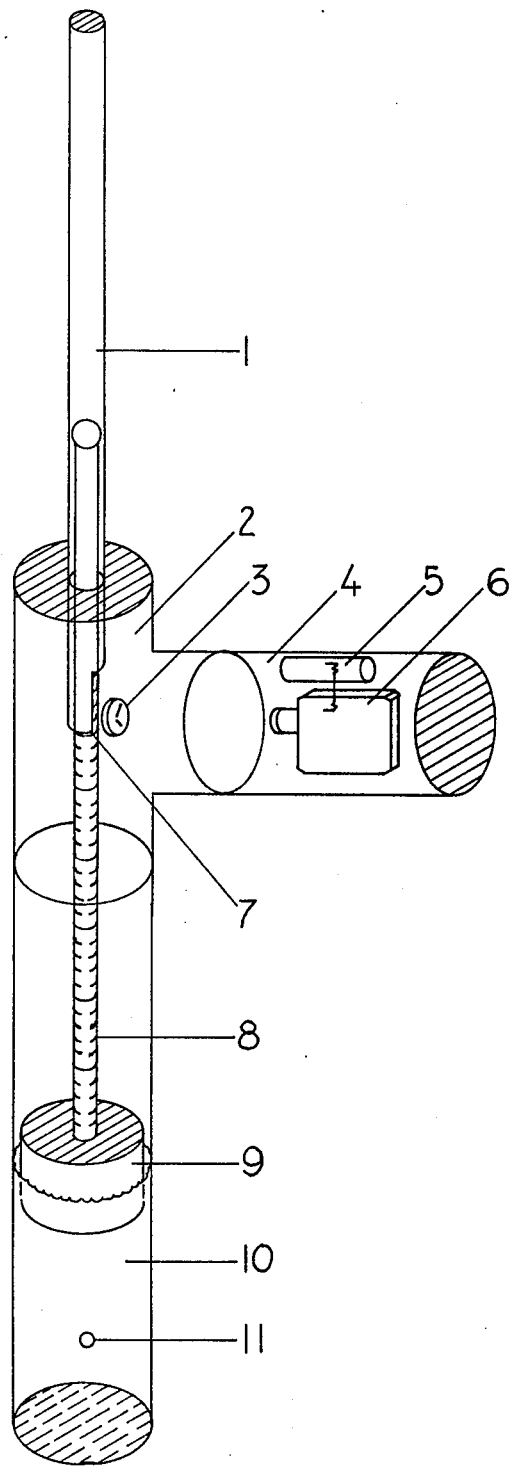

PHOTO-TIDE LEVEL RECORDER

BRIEF SUMMARY

A-Tide Level Recorder incorporates the use of of a free floating graduated rod-staff for recording accurate tide water elevations.

DETAILED DESCRIPTION

A bouyant graduated rod-staff is floated within the confine of a vertical closed container, which permits the free flow of water, as tide rises and falls, thru an intake orifice near the bottom of the container. The elevation of the rod-staff is relative to an index mark in the container which is at a fixed height above the orifice. The tide level recorder records a chronometer reading simultaneous to the rod-staff reading, to relate the tide elevation record to specific times.

The FIGURE shows a preferred embodiment using an automatic time-laps camera.

The most common utilized design is a 6" diameter plastic container tube (9) sealed at the bottom, enclosing a 5½" diameter plastic float (10). On top of the float a ¾" diameter plastic graduated rod-staff (8) is mounted vertically. An intake orifice (11) is drilled thru the container side, near its bottom, to permit the free flow of water, but far enough above the bottom for the float and rod-staff to remain buoyant when the water level inside the container recedes to the orifice. The orifice dampens external wave action and restricts the entering of debris into the container. The bottom point of the orifice is the vertical reference for the rod-staff and subsequent related tide elevations. When the tide rises above the orifice the water level inside the container maintains the same elevation as the water level outside the container. The rod-staff rises and falls relative to the tide level. A 6" diameter plastic T (2) is mounted vertically on the container tube at a point above the highest water level reached. A chronometer (3) and an index mark (7) are attached to the inside of the T, adjacent to, but not touching, the free floating rod-staff. A 6" diameter plastic horizontal extension (4) from the T, perpendicular to the vertical container tube and rod-staff, and adjacent to the chronometer and index mark, is mounted for inserting an automatic, time-laps camera (6), and a light flash (5) synchronized with the camera. The index mark and camera are at a fixed height above the orifice. Vertically mounted above the T is an 1½" diameter plastic tube (1), which acts as a vertical guide for the rod-staff as it rises and falls with the tide.

The length and diameter of the container tube, rod-staff, and rod-staff guide tube, and the height of the index mark and camera above the orifice, are variable and dependent on the magnitude of the tide range of differences of water levels to be measured.

The distinguishing feature of this invention is the utilization of a free floating rod-staff to directly record tide elevations. It improves the accuracy of tide recording over existing available tide gages, because it eliminates the common errors caused by mechanical features, and by photo recording the staff elevation from a fixed camera platform, relative to a fixed orifice and index mark, it eliminates direct reading of the water level on the staff, where distorted readings may be introduced because of a meniscus, or parallax due to an inclined camera angle.

The instrument was developed for utilization where tide level differences, at specific times, are desired for the determination of accurate tide elevations. It was designed principally for precision tidal determinations; however, it can be practically utilized to measure any water elevation differences, such as occur in rivers, streams, lakes, etc.

I claim:

1. A tide level recorder comprises a free floating float with a vertical attached graduated rod-staff, encased in a closed vertical cylindrical tube, which has an orifice near the bottom end of the tube to allow the free flow of water in and out as the tide rises and falls; a fixed index mark near the upper end of the tube for reading the rod-staff graduations as the staff rises and falls with the tide; a recorder opposite the index mark to document the rod-staff graduation readings; and a chronometer to document exact times when rod-staff readings are made.

* * * * *

UNITED STATES PATENT AND TRADEMARK OFFICE
CERTIFICATE OF CORRECTION

PATENT NO. : 4,268,839
DATED : May 19, 1981
INVENTOR(S) : Jack E. Guth

It is certified that error appears in the above-identified patent and that said Letters Patent is hereby corrected as shown below:

On The Title Page and Column 1, Title of invention should read --TIDE LEVEL RECORDER--.

Signed and Sealed this

Twelfth Day of October 1982

[SEAL]

Attest:

GERALD J. MOSSINGHOFF

Attesting Officer     Commissioner of Patents and Trademarks